US012555220B2

(12) United States Patent
Maruyama

(10) Patent No.: US 12,555,220 B2
(45) Date of Patent: Feb. 17, 2026

(54) PATTERN DEFECT DETECTION METHOD

(71) Applicant: TASMIT, INC., Yokohama (JP)

(72) Inventor: Kotaro Maruyama, Yokohama (JP)

(73) Assignee: TASMIT, INC., Yokohama (JP)

( * ) Notice: Subject to any disclaimer, the term of this patent is extended or adjusted under 35 U.S.C. 154(b) by 339 days.

(21) Appl. No.: 17/921,331

(22) PCT Filed: Apr. 21, 2021

(86) PCT No.: PCT/JP2021/016160
§ 371 (c)(1),
(2) Date: Oct. 25, 2022

(87) PCT Pub. No.: WO2021/220906
PCT Pub. Date: Nov. 4, 2021

(65) Prior Publication Data
US 2023/0177673 A1    Jun. 8, 2023

(30) Foreign Application Priority Data
Apr. 30, 2020    (JP) .................................. 2020-080497

(51) Int. Cl.
*G06T 7/00* (2017.01)
*G01N 23/2251* (2018.01)
(Continued)

(52) U.S. Cl.
CPC ............ *G06T 7/0006* (2013.01); *G06V 10/60* (2022.01); *G06V 10/758* (2022.01);
(Continued)

(58) Field of Classification Search
CPC ......... G06T 7/0006; G06T 2207/10061; G06T 2207/30148; G06V 10/761; G06V 10/60; G06V 10/758; G06V 10/764
See application file for complete search history.

(56) References Cited

U.S. PATENT DOCUMENTS

| 2019/0025371 A1* | 1/2019 | Shimoda ......... G01N 21/95607 |
| 2019/0026881 A1* | 1/2019 | Sato .......................... G06T 7/90 |

FOREIGN PATENT DOCUMENTS

| JP | 2010-268009 A | 11/2010 |
| JP | 2019-9256 A | 1/2019 |

OTHER PUBLICATIONS

International Patent Application No. PCT/JP2021/016160; International Search Report and Written Opinion dated Jul. 13, 2021, 7 pgs.
(Continued)

*Primary Examiner* — Ross Varndell
*Assistant Examiner* — Nhut Huy Pham
(74) *Attorney, Agent, or Firm* — Cozen O'Connor

(57) ABSTRACT

This method includes: generating a backscattered-electron image of a multilayered structure (400) including a plurality of patterns formed in a plurality of layers by a scanning electron microscope (50); classifying a plurality of regions of a virtual multilayered structure (300) including a CAD pattern created from design data of the plurality of patterns into a plurality of groups according to CAD pattern arrays in a depth direction of the virtual multilayered structure (300); performing a matching between at least one of the plurality of patterns on the backscattered-electron image and a corresponding CAD pattern; calculating a brightness index value of a region on the backscattered-electron image corresponding to a region belonging to each group; and determining that there is a pattern defect in the region on the backscattered-electron image when the brightness index value is out of a standard range.

8 Claims, 6 Drawing Sheets

(51) Int. Cl.
*G06V 10/60* (2022.01)
*G06V 10/74* (2022.01)
*G06V 10/75* (2022.01)
*G06V 10/764* (2022.01)

(52) U.S. Cl.
CPC .......... *G06V 10/761* (2022.01); *G06V 10/764* (2022.01); *G06T 2207/10061* (2013.01); *G06T 2207/30148* (2013.01)

(56) References Cited

OTHER PUBLICATIONS

"SEM-based overlay measurement between via patterns and buried M1 patterns using highvoltage SEM", SPIE, (US), 2017, Metrology, Inspection, and Process Control for Microlithography XXXI, Proc. SPIE 10145.

* cited by examiner

FIRST GROUP :

SECOND GROUP :

THIRD GROUP :

FOURTH GROUP :

FIFTH GROUP :

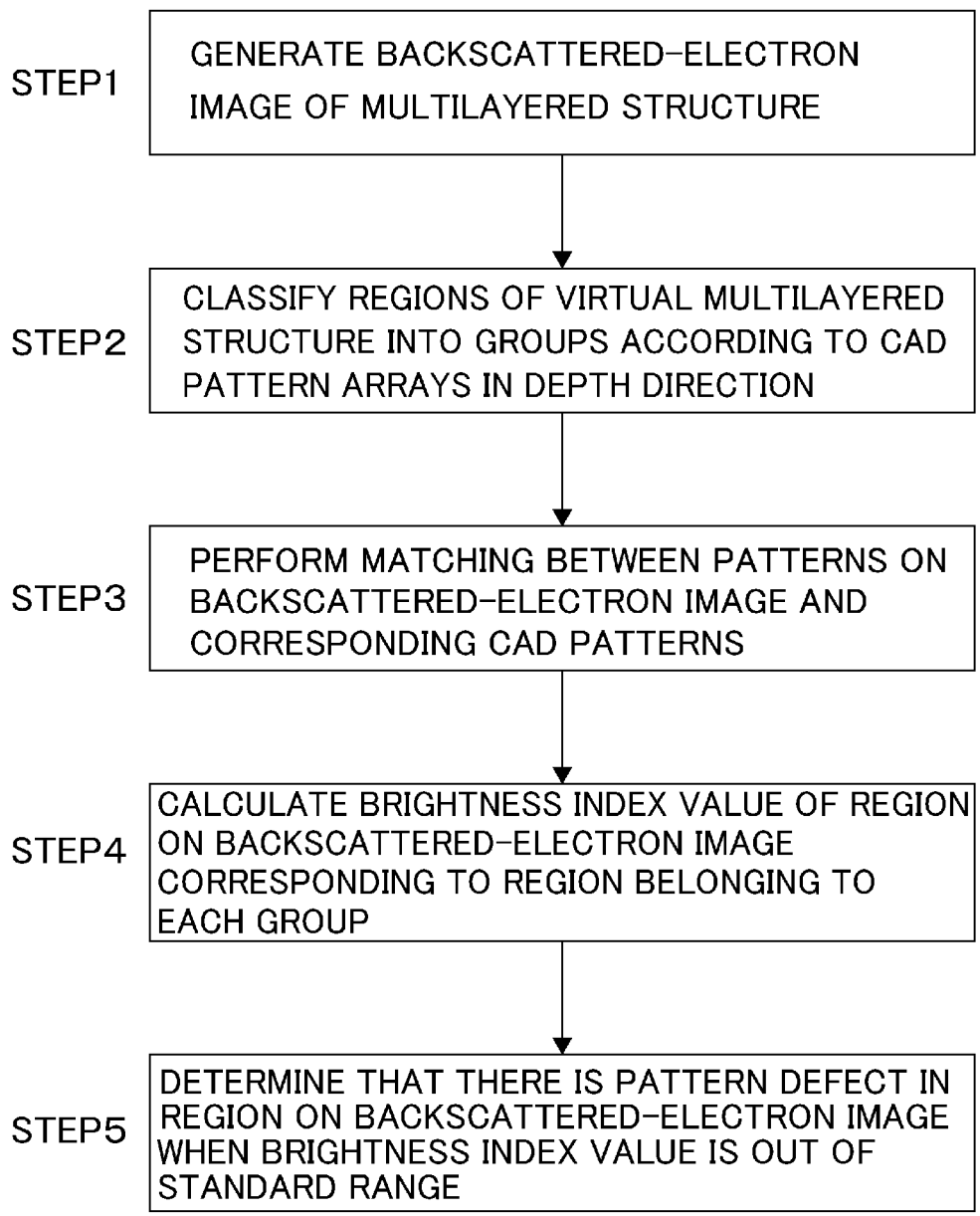

PATTERN DEFECT DETECTION METHOD

CROSS-REFERENCE TO RELATED APPLICATIONS

This application is a 35 U.S.C. § 371 filing of International Application No. PCT/JP2021/016160 filed Apr. 21, 2021, which claims the benefit of priority to Japanese Patent Application No. 2020-080497 filed Apr. 30, 2020, each of which is incorporated herein by reference in its entirety.

TECHNICAL FIELD

The present invention relates to a method of detecting a defect of a pattern, such as a contact and an interconnect, and more specifically, to a detecting method for a defect of a pattern constituting a multilayered structure manufactured based on design data.

BACKGROUND ART

A secondary-electron image of an outermost surface pattern obtained by scanning an electron beam having a low energy is used for an inspection of semiconductor interconnect patterns with use of an electron beam. There is an inspection technique using these secondary-electron images, i.e., a Die-to-Die inspection that compares secondary-electron images of patterns in two or more different shots, or a Die-to-Database inspection that compares design data to a secondary-electron image of patterns (See Patent document 1).

An inspection of an interconnecting process using a potential-contrast image based on Die-to-Database has been proposed (see Patent document 2) as a method of electric-continuity failure inspection in interconnecting process. Further, it has been proposed to measure an overlay (super-imposition) between an outermost surface pattern on a secondary-electron image and a pattern on a transparent image generated by backscattered electrons from a lower layer using a highly-accelerated electron beam (see Non Patent document 1).

CITATION LIST

Patent Literature

Patent document 1: Japanese laid-open patent publication No. 2010-268009
Patent document 2: Japanese laid-open patent publication No. 2019-9256

Non Patent Literature

Non Patent document 1: "SEM-based overlay measurement between via patterns and buried MI patterns using high-voltage SEM", SPIE, (US), 2017, Metrology. Inspection, and Process Control for Microlithography XXXI, Proc. SPIE 10145

SUMMARY OF INVENTION

Technical Problem

In the interconnecting process, not only a shape and a misalignment of the interconnect patterns, but also a shape of lower-via patterns, the center of gravity, and a superposition of layers are important. As disclosed in Non Patent document 1, the inspection using the transparent image obtained by detecting backscattered-electron signals from a plurality of interconnect layer patterns by scanning the highly-accelerated electron beam is expected.

However, the image of the interconnect layer using the highly-accelerated electron beam may change a contrast depending on a material, a thickness, and an interconnect depth of the interconnect layer, a material of an insulating layer, and overlapping of an upper interconnect layer, a via-hole, and a lower interconnect layer. Therefore, it is difficult to adopt the conventional Die-to-Database technique that compares a pattern edge with a pattern edge of design data.

Thus, the present invention provides a method capable of detecting a defect of a pattern constituting a multilayered structure.

Solution to Problem

In an embodiment, there is provided a pattern defect detection method comprising: generating a backscattered-electron image of a multilayered structure including a plurality of patterns formed in a plurality of layers by a scanning electron microscope; classifying a plurality of regions of a virtual multilayered structure including a CAD pattern created from design data of the plurality of patterns into a plurality of groups according to CAD pattern arrays in a depth direction of the virtual multilayered structure; performing a matching between at least one of the plurality of patterns on the backscattered-electron image and a corresponding CAD pattern; calculating a brightness index value of a region on the backscattered-electron image corresponding to a region belonging to each group; and determining that there is a pattern defect in the region on the backscattered-electron image when the brightness index value is out of a standard range.

In an embodiment, the brightness index value is represented by a statistic of brightness of pixels in the region on the backscattered-electron image.

In an embodiment, the statistic is a maximum value, a minimum value, a median value, an average value, a standard deviation value, or a combination thereof.

Advantageous Effects of Invention

The method according to the present invention can inspect an open defect, a short defect, a shape defect, and an overlap defect between via and interconnect in a plurality of semiconductor interconnect layers at a time. In addition, the method according to the present invention enables a detection of systematic defects by using the Die to Database technique, and further enables an inspection of a multilayered structure with a single backscattered-electron image.

FIG. 6 is a flowchart illustrating an embodiment of a method of detecting a defect of a pattern.

DESCRIPTION OF EMBODIMENTS

Hereinafter, embodiments of the present invention will be described with reference to the drawings.

Figure 1:
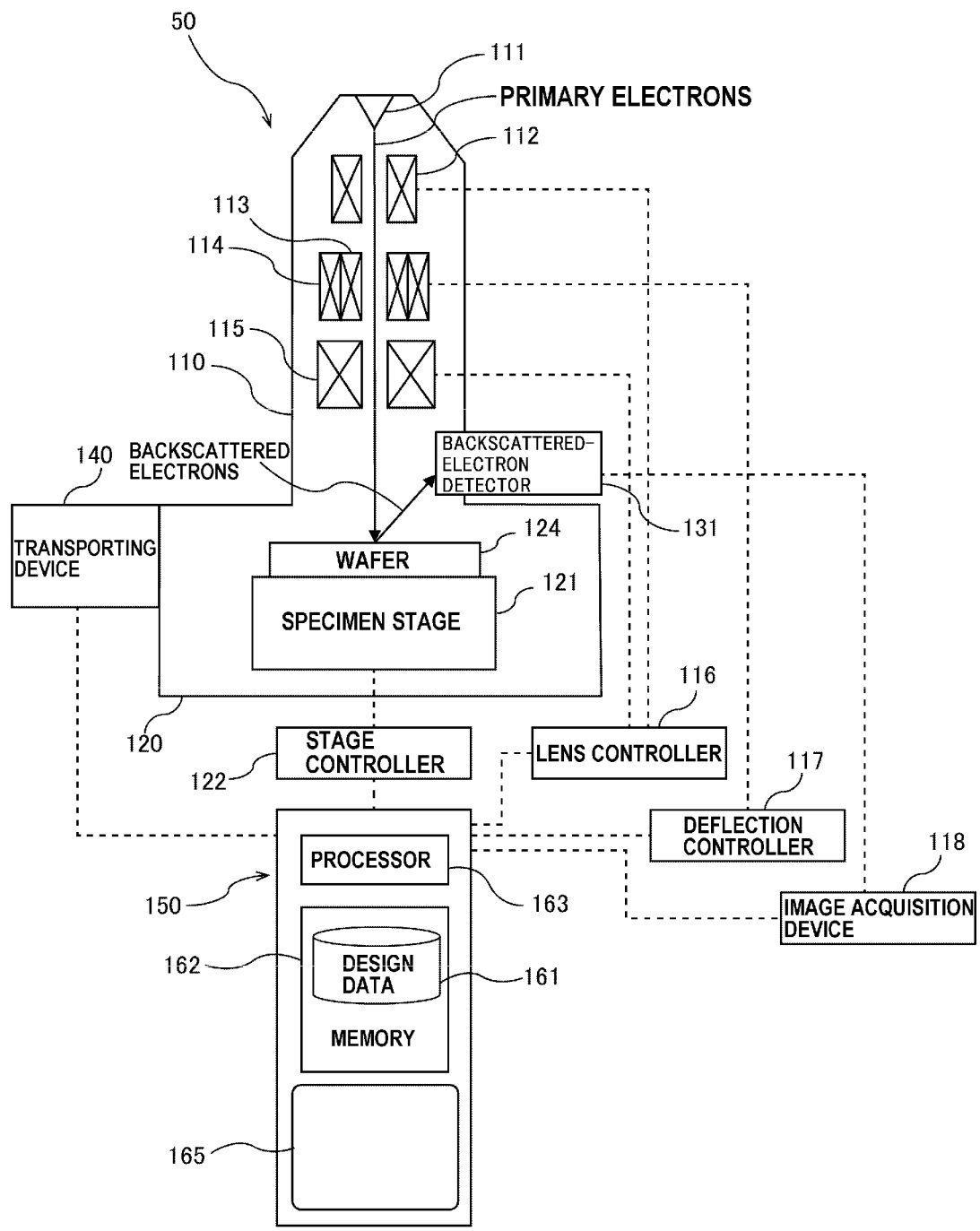
FIG. 1 is a schematic diagram showing an embodiment of an image generating apparatus.

FIG. 1 is a schematic diagram showing an embodiment of an image generating apparatus. As shown in FIG. 1, the image generating apparatus includes a scanning electron microscope 50 and an arithmetic system 150. The scanning electron microscope 50 is coupled to the arithmetic system 150, and operations of the scanning electron microscope 50 are controlled by the arithmetic system 150.

The arithmetic system 150 includes a memory 162 storing a database 161 and programs therein, a processor 163 configured to perform arithmetic operations according to instructions contained in the programs, and a display 165 configured to display an image, a GUI (graphical user interface), and the like. The processor 163 includes a CPU (central processing unit), a GPU (graphic processing unit), or the like, which is configured to perform arithmetic operations according to instructions contained in the programs stored in the memory 162. The memory 162 includes a main memory (e.g., random access memory) to which the processor 163 is accessible, and an auxiliary memory (e.g., hard disk drive or solid state drive) configured to store the data and the programs.

The arithmetic system 150 includes at least one computer. For example, the arithmetic system 150 may be an edge server connected to the scanning electron microscope 50 by a communication line, or may be a cloud server connected to the scanning electron microscope 50 by a communication network, such as the Internet or a local network, or may be a fog computing device (e.g., gateway, fog server, router, etc.) installed in a network connected to the scanning electron microscope 50. The arithmetic system 150 may be a combination of a plurality of servers. For example, the arithmetic system 150 may be a combination of an edge server and a cloud server connected to each other by a communication network, such as the Internet or a local network. In another example, the arithmetic system 150 may include a plurality of servers (computers) that are not connected by a network.

The scanning electron microscope 50 has an electron gun 111 configured to emit an electron beam composed of primary electrons (charged particles), a converging lens 112 configured to converge the electron beam emitted from the electron gun 111, an X deflector 113 configured to deflect the electron beam in an X direction, a Y deflector 114 configured to deflect the electron beam in a Y direction, and an objective lens 115 configured to focus the electron beam on a wafer 124 which is an example of a workpiece. A configuration of the electron gun 111 is not particularly limited. For example, a field-emitter type electron gun, a semiconductor-photocathode type electron gun, etc. can be used as the electron gun 111.

The converging lens 112 and the objective lens 115 are coupled to a lens controller 116, and operations of the converging lens 112 and the objective lens 115 are controlled by the lens controller 116. The lens controller 116 is coupled to the arithmetic system 150. The X deflector 113 and the Y deflector 114 are coupled to a deflection controller 117, and deflecting operations of the X deflector 113 and the Y deflector 114 are controlled by the deflection controller 117. The deflection controller 117 is also coupled to the arithmetic system 150. A backscattered-electron detector 131 is coupled to an image acquisition device 118. The image acquisition device 118 is configured to convert output signals of the backscattered-electron detector 131 into a backscattered-electron image. The image acquisition device 118 is also coupled to the arithmetic system 150.

A specimen stage 121 is disposed in a specimen chamber 120. The specimen stage 121 is coupled to a stage controller 122, so that the position of the specimen stage 121 is controlled by the stage control device 122. The stage controller 122 is coupled to the arithmetic system 150. A transporting device 140 for placing the wafer 124 onto the specimen stage 121 in the specimen chamber 120 is also coupled to the arithmetic system 150.

The electron beam emitted from the electron gun 111 is converged by the converging lens 112, and is then focused by the objective lens 115 onto the surface of the wafer 124, while the electron beam is deflected by the X deflector 113 and the Y deflector 114. When the wafer 124 is irradiated with the primary electrons of the electron beam, backscattered electrons are emitted from the wafer 124. The backscattered electrons are detected by the backscattered-electron detector 131. The detection signals of the backscattered electrons output from the backscattered-electron detector 131 are input to the image acquisition device 118, and are converted into the backscattered-electron image by the image acquisition device 118. The backscattered-electron image is transmitted to the arithmetic system 150.

The primary electrons forming the electron beam enter an inside of the wafer 124 and are scattered in the wafer 124 to form the backscattered electrons. The backscattered electrons are high-energy electrons emitted from the wafer 124. A material having a large atomic number and a high density tends to result in a high emission-signal intensity. Therefore, the backscattered-electron image has a characteristic that a composition of the wafer 124 is easily reflected in a contrast. The backscattered-electron signals, which are composed of the electron beam having energy high enough to reach a sufficient depth in a multilayered structure, contain information of a structure and a composition of the wafer 124 in a depth direction at a position where the electron beam is applied.

In a manufacturing process of a semiconductor device, metal interconnect layers and via layers each having a high density are formed in insulating layers having a relatively low density. The backscattered-electron image, obtained by irradiating the semiconductor device with the electron beam having a high energy, has a high brightness at interconnects and via patterns, and has a low brightness at the insulating layers. As the interconnects and the vias overlap and a total height of the metal layers increases, the brightness tends to increase. Utilizing such characteristics, as described below, a method according to the present embodiment inspects patterns of a plurality of layers at a time by using design data and evaluating the brightness of the backscattered-electron image for each region classified according to compositions of materials in the depth direction (i.e., compositions of overlapping patterns) of the multilayered structure.

Hereinafter, an embodiment of a method of detecting a defect of pattern on the backscattered-electron image generated by the scanning electron microscope 50 will be described. In the following descriptions, patterns of the wafer 124 are formed based on design data (also referred to as CAD data). CAD is an abbreviation for computer-aided design.

The design data of the patterns formed on the wafer 124 is stored in advance in the memory 162. The design data includes design information of the patterns, such as coordinates of vertices of the patterns formed on the wafer 124, positions, shapes, and sizes of the patterns, and the number of the layer to which each pattern belongs. The database 161 is created in the memory 162. The design data of the patterns are stored in advance in the database 161. The arithmetic system 150 can readout the design data of the patterns from the database 161 stored in the memory 162.

The design data includes design information of the patterns formed on the wafer 124. CAD patterns on the design data described below are virtual patterns defined by the design information of the patterns included in the design data. The patterns actually formed on the wafer 124 may be referred to as actual patterns.

Figure 2:
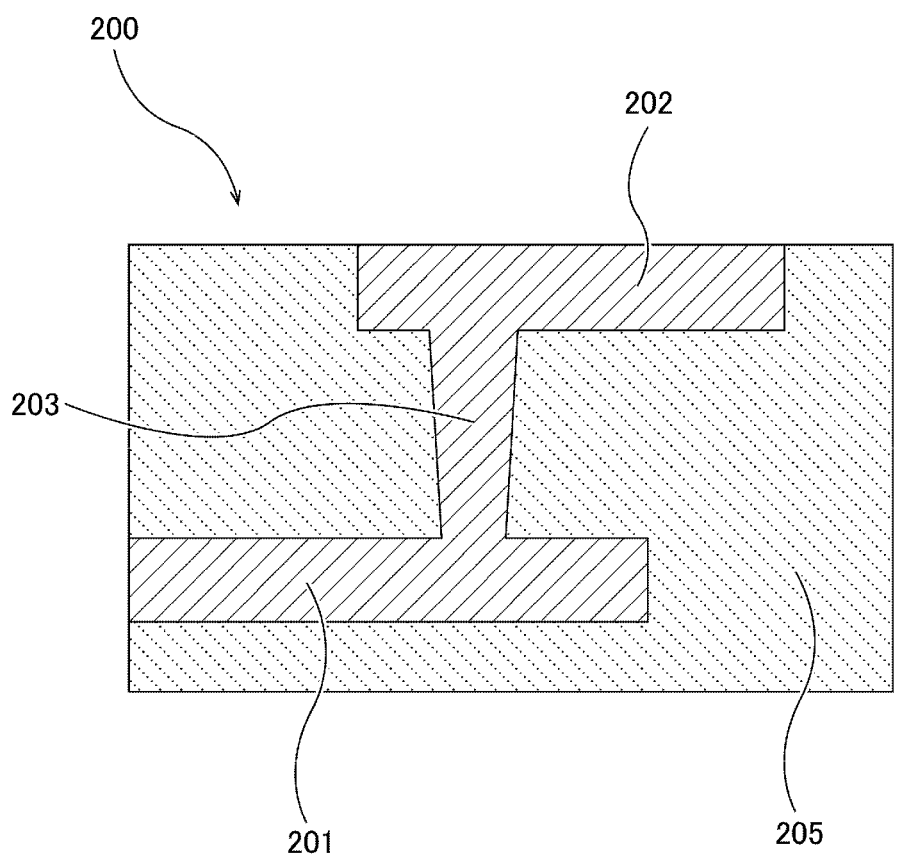
FIG. 2 is a cross-sectional view illustrating an example of a multilayered structure constituting a semiconductor device.

FIG. 2 is a cross-sectional view illustrating an example of the multilayered structure constituting the semiconductor device. A multilayered structure 200 includes a first interconnect pattern 201 located in a first layer, a second interconnect pattern 202 located in a second layer, and a via pattern 203 extending between the first interconnect pattern 201 and the second interconnect pattern 202. The first interconnect pattern 201, the second interconnect pattern 202, and the via pattern 203 are formed in an insulating layer 205. In the example shown in FIG. 2, the second layer is located higher than the first layer.

The via pattern 203 extends perpendicularly to the first interconnect pattern 201 and the second interconnect pattern 202. One end of the via pattern 203 is coupled to the first interconnect pattern 201, and the other end of the via pattern 203 is coupled to the second interconnect pattern 202. Therefore, the via pattern 203 establishes an electrical connection between the first interconnect pattern 201 and the second interconnect pattern 202.

Figure 3:
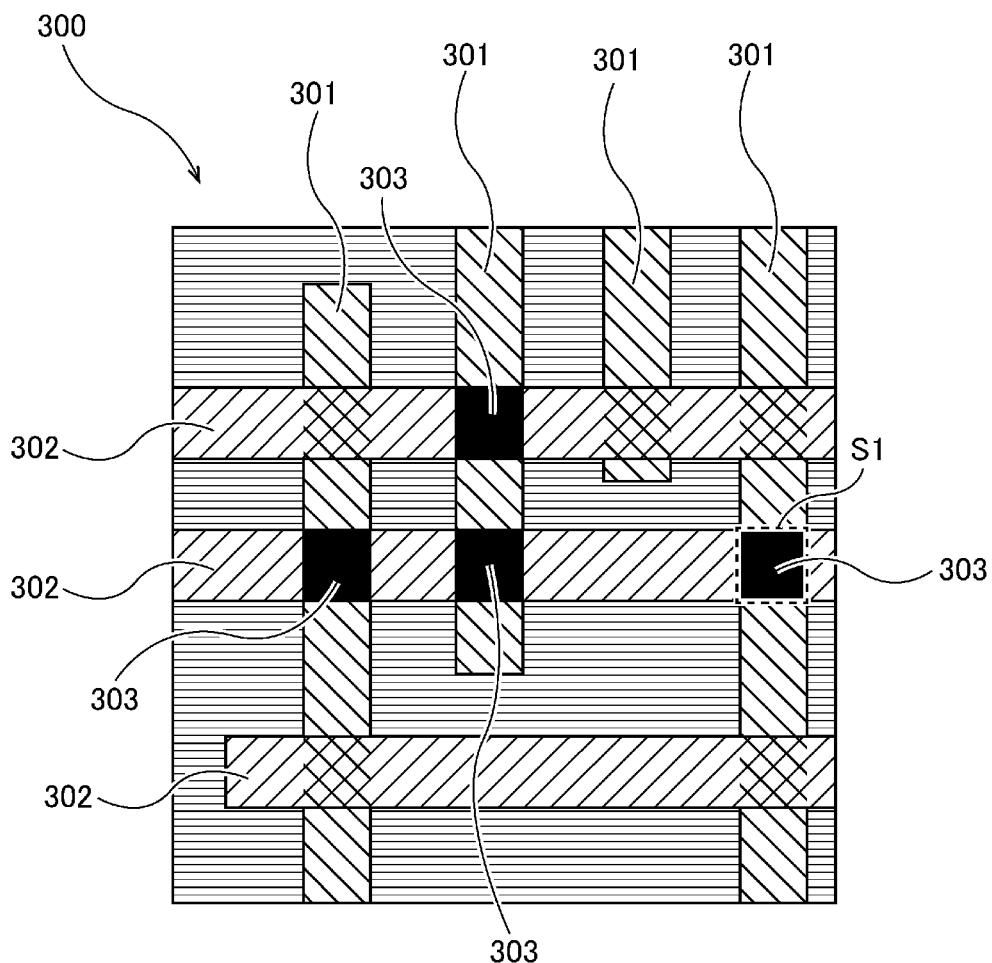
FIG. 3 is a schematic diagram showing an example of a virtual multilayered structure including CAD patterns created from design data of patterns formed on a wafer.
Figure 3:
Figure 3:
Figure 3:
Figure 3:
Figure 3:

FIG. 3 is a schematic diagram showing an example of a virtual multilayered structure 300 including CAD patterns created from the design data of patterns formed on the wafer 124. The CAD patterns include first interconnect CAD patterns 301 located in a first layer, second interconnect CAD patterns 302 located in a second layer, and via CAD patterns 303 extending between the first interconnect CAD patterns 301 and the second interconnect CAD patterns 302. The first layer and the second layer are located in different heights. Hereinafter, the first interconnect CAD patterns 301, the second interconnect CAD patterns 302, and the via CAD patterns 303 may be collectively referred to simply as CAD patterns.

In the example of FIG. 3, regions of the virtual multilayered structure 300 can be classified into following five groups based on CAD pattern arrays (i.e., compositions of overlapping CAD patterns) in a depth direction of the virtual multilayered structure 300.

A first group: regions where the first interconnect CAD patterns 301, the second interconnect CAD patterns 302, and the via CAD patterns 303 overlap.

A second group: regions where the second interconnect CAD patterns 302 are located above the first interconnect CAD patterns 301 and there are no via CAD pattern 303.

A third group: regions where there are the first interconnect CAD patterns 301 and there are no second interconnect CAD pattern 302 and no via CAD pattern 303.

A fourth group: regions where there are the second interconnect CAD patterns 302 and there are no first interconnect CAD pattern 301 and no via CAD pattern 303.

A fifth group: regions where there are no first interconnect CAD pattern 301, no second interconnect CAD pattern 302, and no via CAD pattern 303.

The arithmetic system 150 classifies the plurality of regions of the virtual multilayered structure 300 shown in FIG. 3 into the first group to the fifth group based on the CAD pattern arrays in the depth direction of the virtual multilayered structure 300. For example, a region S1 of the virtual multilayered structure 300 shown in FIG. 3 belongs to the first group. The plurality of groups from the first group to the fifth group have different CAD pattern arrays in the depth direction.

Figure 4:
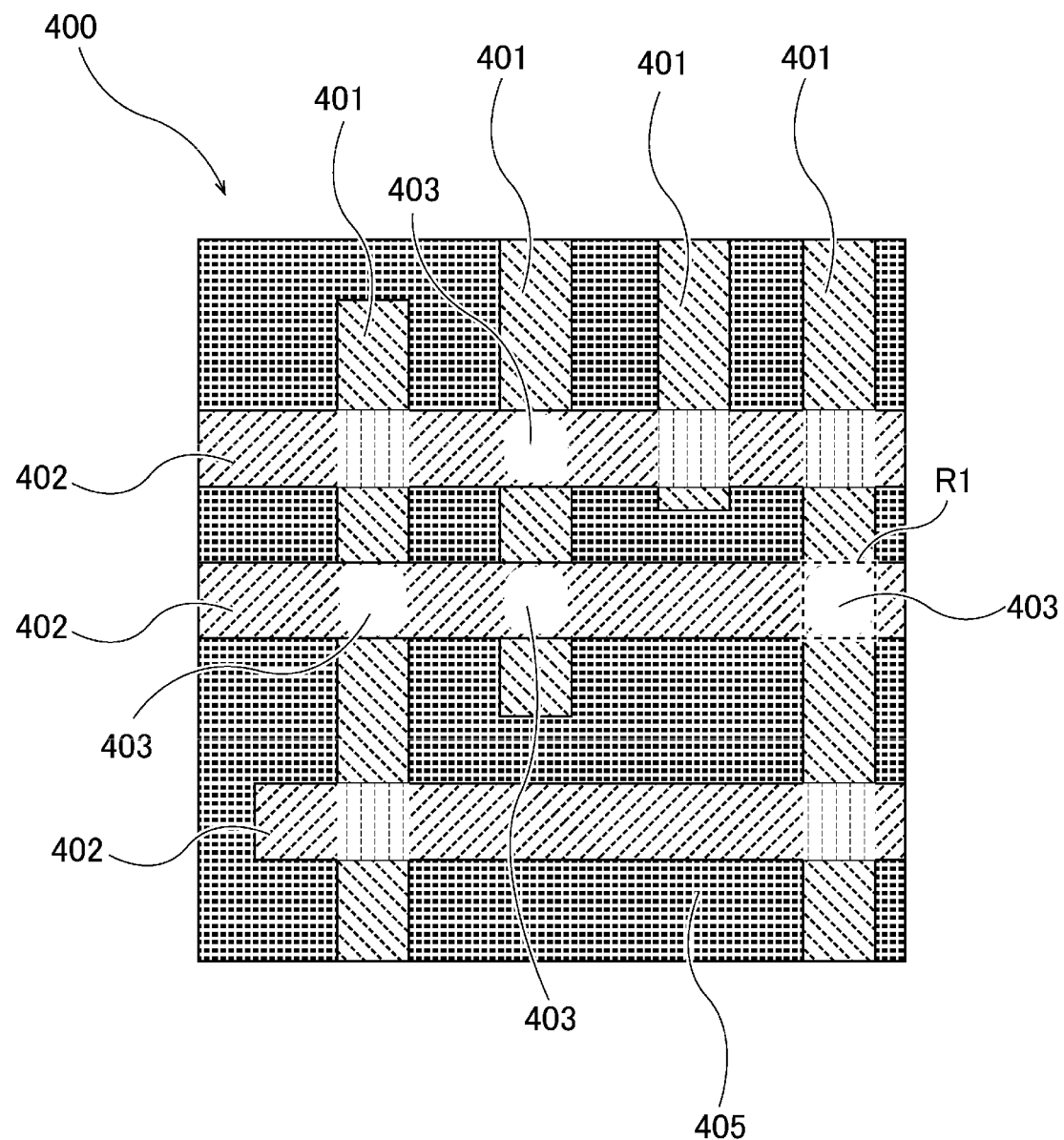
FIG. 4 is a schematic diagram of a backscattered-electron image of a multilayered structure actually manufactured on the wafer according to the CAD patterns shown in FIG. 3.

FIG. 4 is a schematic diagram of a backscattered-electron image of a multilayered structure 400 actually manufactured on the wafer 124 according to the CAD patterns shown in FIG. 3. The multilayered structure 400 shown in FIG. 4 corresponds to the virtual multilayered structure 300 shown in FIG. 3. Specifically, first interconnect patterns 401 on the backscattered-electron image shown in FIG. 4 correspond to the first interconnect CAD patterns 301 in FIG. 3, second interconnect patterns 402 on the backscattered-electron image shown in FIG. 4 correspond to the second interconnect CAD patterns 302 in FIG. 3, and via patterns 403 on the backscattered-electron image shown in FIG. 4 correspond to the via CAD pattern 303 in FIG. 3.

As shown in FIG. 4, portions where the patterns overlap are white, and portions where there is no pattern are black. In other words, the thicker the metal, the higher the brightness. As shown in FIG. 4, portions where the first interconnect patterns 401, the second interconnect patterns 402, and the via patterns 403 overlap have the highest brightness. An insulating layer 405, in which none of the first interconnect patterns 401, the second interconnect patterns 402, and the via patterns 403 are present, has the lowest brightness. In one embodiment, the brightness is a numerical value according to a gray scale.

The backscattered-electron image shown in FIG. 4 is generated by the scanning electron microscope 50 shown in FIG. 1. The arithmetic system 150 obtains the backscattered-electron image from the scanning electron microscope 50, and performs matching between the plurality of patterns on the backscattered-electron image and the CAD pattern created from the design data.

The above pattern matching is performed according to a known method. For example, the arithmetic system 150 superimposes the backscattered-electron image and the CAD pattern created from the design data, creates a gray-level profile of the backscattered-electron image within a set range starting from an edge of the CAD pattern, determines an edge of the pattern on the backscattered-electron image from the gray-level profile, and determines a matching position where a bias value between a position of the determined edge and a position of a corresponding edge of the CAD pattern is minimized. The bias value is an index value indicating an amount of deviation (distance) between the edge determined from the gray-level profile and the corresponding edge of the CAD pattern. A plurality of CAD patterns on a plurality of layers are used for the above pattern matching, while in one embodiment, a CAD pattern in a single layer which is the most appropriate for the pattern matching may be used.

The arithmetic system 150 calculates a brightness index value of a region on the backscattered-electron image corresponding to a region of the virtual multilayered structure 300 belonging to each group. Specifically, the arithmetic system 150 calculates a brightness index value of a region on the backscattered-electron image corresponding to each region belonging to the first group shown in FIG. 3. For example, the arithmetic system 150 calculates a brightness index value of a region R1 (see FIG. 4) on the backscattered-electron image corresponding to the region S1 (see FIG. 3) belonging to the first group. The region S1 (see FIG. 3)

belonging to the first group and the corresponding region R1 (see FIG. 4) on the backscattered-electron image are at the same position and have the same size.

Since the region R1 is a region where the first interconnect pattern 401, the second interconnect pattern 402, and the via pattern 403 overlap, the region R1 has the highest brightness. The arithmetic system 150 calculates the brightness index value which is a statistic of brightness of pixels in the region R1. The brightness index value is an index indicating the brightness of the region R1. In the present embodiment, the brightness index value is a maximum value, a minimum value, a median value, an average value, a standard deviation value, or a combination thereof of the brightness of the pixels in the region R1.

The brightness index value varies depending on the compositions of overlapping patterns. In other words, the brightness index value is a unique value that is determined depending on the compositions of overlapping patterns. When this brightness index value is out of a predetermined range, it can be determined that there is a defect of the pattern. The arithmetic system 150 determines whether or not the calculated brightness index value is within a predetermined first standard range, and when the brightness index value is out of the first standard range, the arithmetic system 150 determines that there is a defect of the pattern in the region R1.

Figure 5:
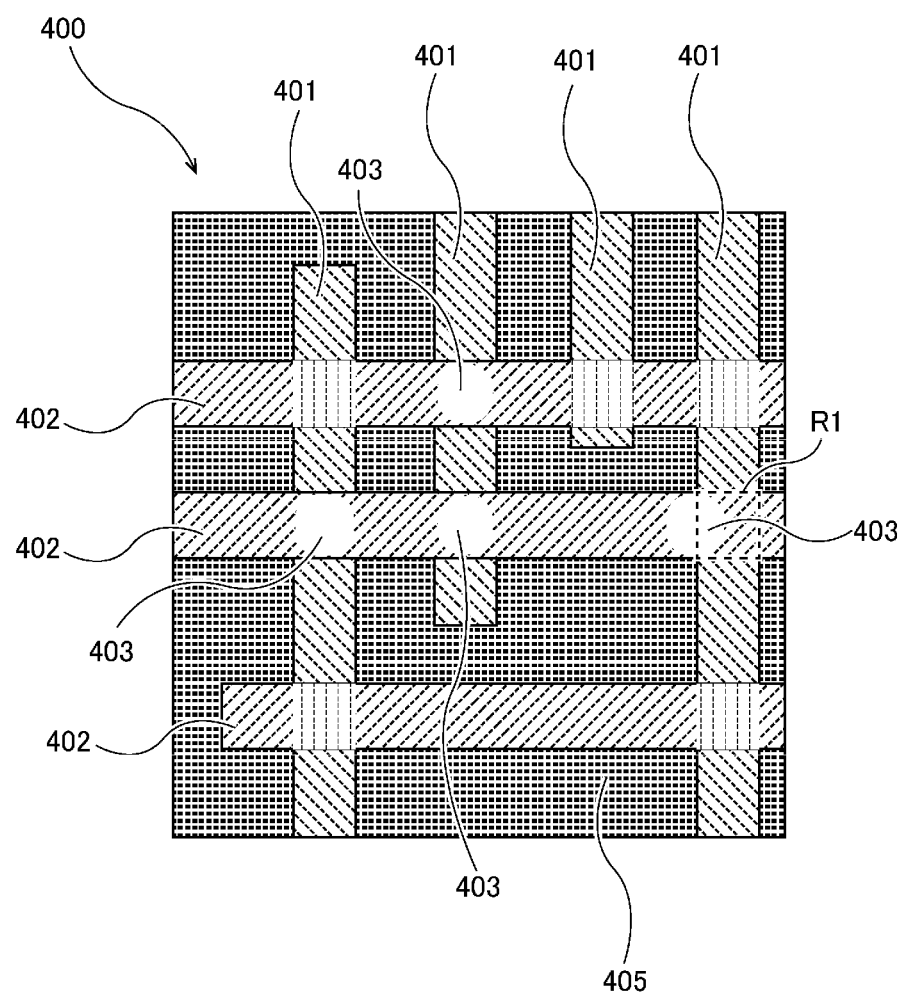
FIG. 5 is a diagram showing a defect of a via-pattern as an example of a pattern defect.

FIG. 5 is a diagram showing a defect of the via pattern 403 as an example of a pattern defect. In the example shown in FIG. 5, the via pattern 403 is shifted. As a result, the brightness index value of the region R1 is out of the first standard range. In this way, the arithmetic system 150 can determine whether or not there is a pattern defect in the region R1 by comparing the brightness index value with the first standard range.

Similarly, the arithmetic system 150 calculates a brightness index value of a region on the backscattered-electron image of FIG. 4 corresponding to a region of the second group shown in FIG. 3, determines whether or not the calculated brightness index value is within a predetermined second standard range. When the brightness index value is out of the second standard range, the arithmetic system 150 determines that there is a defect of the pattern in the region on the backscattered-electron image. Similarly for the third group, the fourth group, and the fifth group, the arithmetic system 150 determines whether or not respective brightness index values are within a third standard range, a fourth standard range, and a fifth standard range.

According to the present embodiment, defects of patterns of a plurality of layers can be detected at a time with use of a single backscattered-electron image. In particular, the method according to the present embodiment can correctly evaluate the multilayered structure 400 by determining a defect of a pattern itself that may affect a resistance value of the semiconductor device and a defect of the compositions of overlapping patterns. Examples of pattern defect that can be detected by this method include pattern shift, pattern missing, short circuit, disconnection (open circuit), and pattern deformation, but are not limited to these examples.

FIG. 6 is a flowchart illustrating an embodiment of the method of detecting a defect of the pattern.

In step 1, the arithmetic system 150 instructs the scanning electron microscope 50 to generate the backscattered-electron image of the multilayered structure 400 including the plurality of patterns formed in the plurality of layers. The backscattered-electron image is transmitted from the scanning electron microscope 50 to the arithmetic system 150.

In step 2, the arithmetic system 150 classifies the plurality of regions of the virtual multilayered structure 300 including the CAD patterns created from the design data of the patterns constituting the multilayered structure 400 into the plurality of groups according to the CAD pattern arrays in the depth direction of the virtual multilayered structure 300. The number of groups may vary depending on arrangements of the CAD patterns in the entire virtual multilayered structure 300.

In step 3, the arithmetic system 150 performs the matching between the patterns 401, 402, and 403 of the plurality of layers on the backscattered-electron image and the corresponding CAD patterns 301, 302, and 303. This matching is performed for identifying the plurality of patterns on the backscattered-electron image. In one embodiment, patterns in only a single layer may be used for the pattern matching to facilitate pattern matching.

In step 4, the arithmetic system 150 calculates the brightness index value of the region on the backscattered-electron image corresponding to the region belonging to each group.

In step 5, the arithmetic system 150 determines that there is a pattern defect in the region on the backscattered-electron image when the brightness index value is out of the standard range. The standard range is set for each group.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a method of detecting a defect of a pattern, such as a contact and an interconnect, and more specifically applicable to a detecting method for a defect of a pattern constituting a multilayered structure manufactured based on design data.

REFERENCE SIGNS LIST 50 scanning electron microscope
111 electron gun
112 converging lens
113 X deflector
114 Y deflector
115 objective lens
116 lens controller
117 deflection controller
118 image acquisition device
120 specimen chamber
121 specimen stage
122 stage controller
124 wafer
131 backscattered-electron detector
140 transporting device
150 arithmetic system
161 database
162 memory
163 processor
165 display
200 multilayered structure
201 first interconnect pattern
202 second interconnect pattern 203 via pattern
205 insulating layer
300 virtual multilayered structure
301 first interconnect CAD pattern
302 second interconnect CAD pattern
303 via CAD pattern
400 multilayered structure
401 first interconnect pattern
402 second interconnect pattern
403 via pattern
405 insulating layer

What is claimed is:

1. A pattern defect detection method comprising:
generating, using a scanning electron microscope, an image of a multilayered structure including a plurality of actual patterns formed in a plurality of layers;
classifying a plurality of virtual regions within a first virtual pattern and a second virtual pattern of a virtual multilayered structure created from design data of the plurality of actual patterns into a plurality of groups according to compositions of overlapping virtual patterns arrayed in a depth direction of the virtual multilayered structure, the plurality of groups including a first group in which the first virtual pattern and the second virtual pattern overlap, a second group in which the first virtual pattern exists and the second virtual pattern does not exist, and a third group in which the second virtual pattern exists and the first virtual pattern does not exist;
performing a matching between at least one actual pattern of the plurality of actual patterns on the image and a corresponding virtual pattern;
calculating a brightness index value of a region on the image corresponding to a virtual region; and
determining that there is a pattern defect in the region on the image when the brightness index value is out of a standard range associated with the group into which the corresponding virtual region of the virtual multilayered structure was classified.

2. The pattern defect detection method according to claim 1, wherein the brightness index value is represented by a statistic of brightness of pixels in the region on the image.

3. The pattern defect detection method according to claim 2, wherein the statistic comprises a maximum value, a minimum value, a median value, an average value, a standard deviation value, or a combination thereof.

4. The pattern defect method according to claim 1 wherein there are more than two groups in the plurality of groups.

5. A system for defecting defects comprising:
a scanning electron microscope configured to image a multilayered structure including a plurality of image patterns formed in a plurality of layers;
a processor configured to:
classify a plurality of virtual regions of within a first virtual pattern and a second virtual pattern of a virtual multilayered structure created from design data of the plurality of image patterns into a plurality of groups according to compositions of overlapping virtual patterns arrayed in a depth direction of the virtual multilayered structure, the plurality of groups including a first group in which the first virtual pattern and the second virtual pattern overlap, a second group in which the first virtual pattern exists and the second virtual pattern does not exist, and a third group in which the second virtual pattern exists and the first virtual pattern does not exist,
match an image pattern of the plurality of image patterns on the image and a corresponding virtual pattern,
calculate a brightness index value of a region on the image corresponding to a virtual region of the plurality of virtual regions for each group of the plurality of groups, and
determine that there is a pattern defect in the region on the image when the brightness index value of a region of the matched image pattern is out of an expected standard range associated with the group into which the corresponding virtual region of the virtual multilayered structure was classified.

6. The system for detecting defects according to claim 5, wherein the brightness index value is represented by a statistic of brightness of pixels in the region on the image.

7. The system for detecting defects according to claim 6, wherein the statistic comprises a maximum value, a minimum value, a median value, an average value, a standard deviation value, or a combination thereof.

8. The system for detecting defects according to claim 5 wherein there are more than two groups in the plurality of groups.

* * * * *